United States Patent [19]

Gongwer

[11] 4,326,554
[45] Apr. 27, 1982

[54] FLUID CONTROL VALVE

[75] Inventor: Calvin A. Gongwer, Glendora, Calif.

[73] Assignee: Innerspace Corporation, Glendora, Calif.

[21] Appl. No.: 107,026

[22] Filed: Dec. 26, 1979

[51] Int. Cl.³ .............................................. F16K 47/08
[52] U.S. Cl. ...................................... 137/14; 251/127; 251/120; 181/233; 138/42; 137/614.2
[58] Field of Search ................. 251/127, 120; 181/233; 138/42; 137/14, 614.2

[56] References Cited

U.S. PATENT DOCUMENTS

| 1,584,315 | 5/1926 | Maxim | 181/269 |
| 3,131,717 | 5/1964 | Gratzmuller | 251/127 X |
| 4,037,615 | 7/1977 | Gongwer | 251/127 X |

*Primary Examiner*—Arnold Rosenthal
*Attorney, Agent, or Firm*—Lyon & Lyon

[57] ABSTRACT

A fluid control valve which avoids wear, cavitation, and high noise level operation and yet is substantially nonclogging. The valve includes a valve nozzle means having at least one preloaded member biased so as to close the valve nozzle means below a preselected incoming fluid pressure. Incoming fluid is spun tangentially within an annular whirl chamber, and then passed through a labyrinth passageway comprising a series of inwardly spaced concentric sleevelike annuli. The concentric sleevelike annuli are so constructed that they may be inserted into a pre-existing plug valve.

14 Claims, 3 Drawing Figures

FLUID CONTROL VALVE

BACKGROUND OF THE INVENTION

1. Field of the Invention

The present relates broadly to a control valve which allows for the fluid control of liquids and gases. More specifically, the invention relates to a control valve which is substantially unsusceptible to plugging, and which operates from a fully open to a fully closed position, relatively noiselessly and free from vibration and cavitation.

2. Description of the Prior Art

Conventional control valves utilize an djustable opening in order to control fluid flows. This adjustable opening may be produced for example in a gate valve or globe valve by adjusting the position of a flat plate, or a ball valve by adjusting the position of a sphere having an opening passing therethrough, or in a plug valve or needle valve by adjusting, respectively, the tapered plug or sharply tapered element. All of such valves are susceptible to severe cavitation with attendant excessive noise levels, vibration and valve wear, particularly at high pressure differentials across the valve.

The subject matter of this invention is an improvement over my previously issued U.S. Pat. No. 4,037,615 issued July 26, 1977 and hereby incorporated by reference.

An objective of the present invention is to provide an improved fluid control valve and method of operation. Further objects and advantages of the present invention become apparent following a reading of the detailed description, drawings and claims.

SUMMARY OF THE INVENTION

A fluid control valve which avoids wear, cavitation and high noise level operation and yet is substantially non-clogging and which includes at least one valve nozzle means having a preloaded member biased so as to close the valve nozzle means below a preselected incoming fluid pressure whereby producing a fluid jet with the fluid subsequently entering the valve and being spun tagentially within an annular whirl chamber and then passing through a labrinth passageway comprising a series of inwardly spaced, concentric sleevelike annuli. In a preferred embodiment, the concentric sleevelike annuli are positioned within a plug valve.

DESCRIPTION OF THE INVENTION

A portion of pressure to be dissipated within a fluid control means is converted into kinetic energy by means of the production of a fluid jet which exists at an opening formed by overcoming a preload selected for a preload member of a valve nozzle means. The jet formed is tangent to an annular whirl chamber in which it builds a strong vortex whereby a major portion of the pressure drop across the fluid control means is produced by an increase in the tangential velocity. The liquid or gas is then led into a labyrinth of the concentric sleeves or annular passages, preferably longer than the whirl chamber and length, in which the very high whirl component of velocity represents in kinetic form the energy to be dissipated by means of pressure drop. This whirl component is therein reduced by hydraulic or fluid friction on the walls of these passages without affecting the thru-flow component. Thus the fluid follows an extended labyrinth passageway wherein the tangential component is dissipated. The axial component of velocity is fixed by the total flow through the valve and is not affected by this process. This may be accomplished by increasing the spacing between the annular walls as the radii are decreased so as to maintain a constant cross-sectional area. The axial component is much smaller than the whirl component except at the outlet where the "quiet" fluid is released to the exit.

Figure 1:
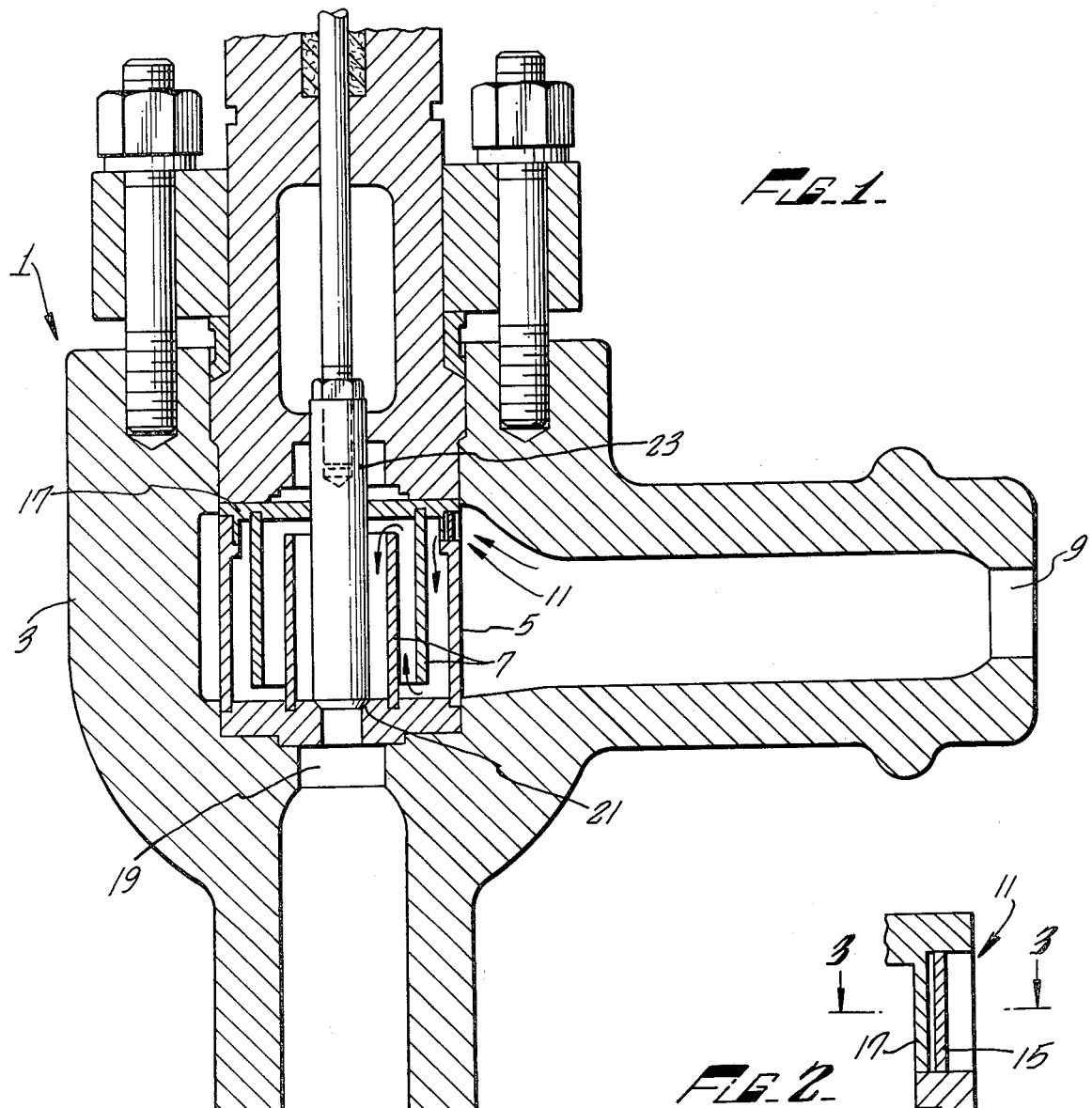
FIG. 1 is a sectional view of the fluid control means of this invention.
Figure 2:
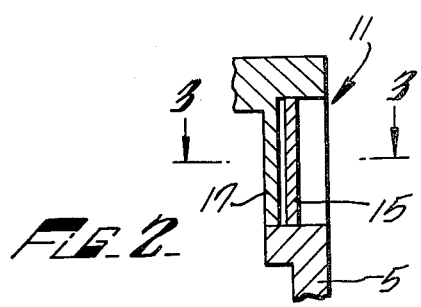
FIG. 2 is an enlarged section of the fluid control means of FIG. 1.

Referring now to FIG. 1, the fluid control means 1 will be discussed in detail. The fluid control means 1 includes a housing means 3 having an axially extending outer wall 5 and a plurality of walls 7. Fluid is admitted to the fluid control means 1 through housing inlet 9.

Figure 3:
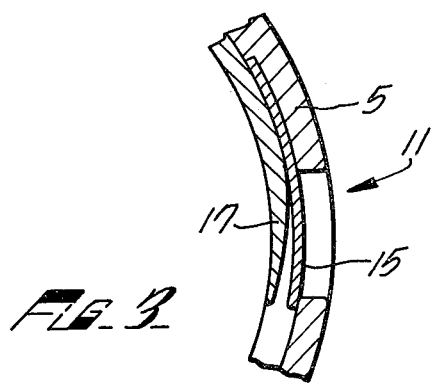
FIG. 3 is a sectional view of the fluid control means of this invention through 3—3 of FIG. 2.

Referring now to FIG. 3, the valve nozzle means 11 of the fluid control means 1 will be discussed in greater detail. A preload member 15 is positioned across an aperture of the axially extending outer wall 5. A preload stop member 17 is positioned in order to limit the travel of the preload member. One or more such valve nozzle means 11 may be utilized with a fluid control means 1. Preferably, between about 10% and 3% of the total pressure drop between the housing inlet 9 and the annular exit 19 of the fluid control means is required to overcome the preload of said preload member 15 of the valve nozzle means 11.

As shown in FIG. 1, the axially extending outer wall 5 and the plurality of inner walls 7 which make up the annular whirl chamber and the labyrinth passageway comprising a series of spaced apart concentric sleeve-like annuli may be placed within a conventional plug valve housing 3 including a plugging member 23 and a seat 21 such that the plugging member 23 may be adjusted with respect to the plugging member seat 21 in order to vary the amount of fluid flow through the fluid control means 1.

Having fully described this invention, it is to be understood that the inventor does not wish to be limited to the details herein set forth, it being understood that modifications may be made by others skilled in the art without departing from the scope of the claims as appended hereto.

What is claimed is:

1. A fluid control means, comprising:
 a housing means providing an axially extending outer wall and a plurality of inner walls, said outer and inner walls in inwardly spaced concentric annular relation, said annular walls having gradually decreasing diameters;
 a housing inlet to an outer annulus formed between said outer wall and the inner wall next adjacent said outer wall;
 means for dissipating fluid flow energy having a valve nozzle means for introducing and tangentially accelerating varying amounts of fluid into said outer annulus and tangential to said outer wall and a means for directing and further tangentially accelerating said fluid having passed through said outer annulus through the series of annuli formed by said inwardly spaced concentric inner walls, said valve nozzle means being further defined as including at least one preloaded member biased so as to close said valve nozzle means below a preselected incoming fluid pressure; and an annular exit being formed by the innermost wall and the next adjacent inner wall.

2. The fluid control means claimed in claim 1 wherein said fluid directing means comprises:

a conduit means joining said series of annuli, each of said annuli having an entrance and an exit at opposite ends thereof, such that the exit of each of said annuli is connected to the entrance of the next smaller annulus, thereby providing a labyrinth passageway for said fluid such that fluid passes along the lengths of progressively smaller annuli alternately in a first direction and then in a direction opposite to said first direction.

3. The fluid control means claimed in claim 1 wherein the surface of said annuli of said labyrinth are progressively smoother as measured from said outer annulus to said annular exit.

4. The fluid control means claimed in claim 1 wherein the surface of said annuli comprises a compliant elastomeric skin.

5. The fluid control means claimed in claim 1 wherein between about 10% and about 30% of the total pressure drop between the said inlet and said exit is required to overcome the preload of said valve nozzle means and a preload member stop is positioned adjacent said preload member in order to limit the total travel of said preload member.

6. The fluid control means claimed in claim 5 further comprising a seat positioned about said annular exit and a plugging member adapted to engaged disengage said seat thereby closing and opening said fluid control means.

7. A method of fluid control comprising:

regulating the amount of said fluid entering a housing means providing an axially extending outer wall and inner walls in inwardly spaced concentric annular relation, said annular walls having gradually decreasing diameters;

dissipating a significant portion of fluid flow energy of said fluid by overcoming a preload of a preload member of a valve nozzle means;

closing said valve nozzle means below a preselected incoming fluid pressure;

accelerating a fluid tangentially about an annular whirl chamber defined by said outer wall and the inner wall next adjacent said outer wall, and thereby decreasing the fluid pressure and dissipating the fluid flow energy;

accelerating and gradually decreasing the annular flow path diameter and further tangentially spinning said fluid through a series of inwardly spaced concentric annuli, thereby further decreasing the fluid pressure and dissipating the fluid flow energy; and discharging said fluid from the inwardmost annulus.

8. The method of fluid control claimed in claim 7 wherein the path produced by said series of inwardly spaced concentric annuli becomes progressively smoother as measured toward the innermost annulus.

9. The method of fluid control means claimed in claim 7 wherein the surface of said annuli comprises a compliant elastomeric skin.

10. The method of fluid control claimed in claim 7 wherein at least 10% of the total pressure drop between the inlet and exit of the fluid control means is required to overcome the preload of said preloaded member of said valve fluid control means valve nozzle means.

11. The method of fluid control means claimed in claim 7 wherein said regulating of the amount of said fluid entering said annual whirl chamber is further defined as adjusting the position of a plugging member with respect to a plugging member seat.

12. A fluid control means comprising:

a housing means providing an axially extending outer wall and plurality of inner walls, said outer and inner walls in adjacent inwardly spaced concentric annular relation and thereby forming a passageway of a series of annuli;

a housing inlet in communication with an outer annulus formed between said outer wall, and the inner wall next adjacent said outer wall;

valve nozzle means adapted to introduce varying amounts of fluid into said outer annulus and tangential to said outer wall said valve nozzle means being further defined as including at least one preload member biased so as to close said valve nozzle means below a preselected incoming fluid pressure;

conduit means for directing said fluid having passed through said outer annulus through said passageways of the series of annuli formed by said inwardly spaced concentric inner walls having gradually decreasing diameters, said conduit means joining said series of annuli, each of said annuli having an entrance and an exit at opposite ends thereof, such that the exit of each of said annuli is connected to the entrance of the next smaller annulus, thereby providing a labyrinth for said fluid such that fluid passes along the lengths of the progressively smaller annuli alternately in a first direction and then a second direction opposite to said first direction.

13. The fluid control means claimed in claim 12 wherein the surface of said annuli of said spiral path are progressively smoother as measured from said outer annulus to said annular exit.

14. The fluid control means claimed in claim 12 wherein the surface of said annuli comprises a compliant elastomeric skin.

* * * * *